United States Patent [19]

Iizawa

[11] 4,407,868
[45] Oct. 4, 1983

[54] PROCESS FOR THE PREPARATION OF INORGANIC FIBER CONTAINING ENAMELWARE

[75] Inventor: Yoshihiro Iizawa, Sayama, Japan

[73] Assignee: Ikebukuro Horo Kogyo Co., Ltd., Tokorozawa, Japan

[21] Appl. No.: 369,640

[22] Filed: Apr. 19, 1982

Related U.S. Application Data

[63] Continuation of Ser. No. 220,726, Dec. 29, 1980, abandoned.

[30] Foreign Application Priority Data

Nov. 18, 1980 [JP] Japan .................................. 55-161357

[51] Int. Cl.³ .............................................. B05D 3/02
[52] U.S. Cl. .............................. 427/376.2; 427/376.4; 427/376.5; 427/380; 427/419.3; 427/419.4; 427/419.6
[58] Field of Search .................. 427/376.2, 402, 419.2, 427/376.4, 376.5, 419.3, 419.4, 419.6, 380; 501/17, 18, 38, 59, 63; 428/426, 469, 472, 702

[56] References Cited

U.S. PATENT DOCUMENTS

| | | | |
|---|---|---|---|
| 2,563,502 | 8/1951 | Sweo ....................................... | 501/17 |
| 3,409,458 | 11/1968 | Spencer-Strong ............... | 427/376.5 |
| 3,709,717 | 1/1973 | Hamling ............................ | 427/376.4 |
| 3,887,386 | 6/1975 | Majumdar ........................... | 501/38 |
| 3,901,720 | 8/1975 | Majumdar ........................... | 501/38 |
| 3,940,277 | 2/1976 | Pierson et al. ....................... | 501/38 |

OTHER PUBLICATIONS

Majumdar et al., "Properties of Glass Fibres in Cement Environment", Journal of Materials Science 12, 1977, pp. 927-936.

Ali et al., "Properties of Glass Fibre Cement-the Effect of Fibre Length Content", Journal of Materials Science 10, 1975, pp. 1732-1740.

Primary Examiner—S. L. Childs
Attorney, Agent, or Firm—Wenderoth, Lind & Ponack

[57] ABSTRACT

A process for preparing enamelware by preparing a slip containing inorganic fibers having a diameter of 5 to 30 microns and a length of 1 to 5 millimeters, enameling a ware with the slip, and drying and firing the enameled ware.

2 Claims, 18 Drawing Figures

COVER COAT LAYER (ROCK FIBER 5%)
GROUND COAT LAYER
IRON OXIDE LAYER
SUBSTRATE METAL

COVER COAT LAYER (ROCK FIBER 5%)

GROUND COAT LAYER

IRON OXIDE LAYER

SUBSTRATE METAL

FIG. 1-4

COVER COAT LAYER

GROUND COAT LAYER
IRON OXIDE LAYER
SUBSTRATE METAL

COVER COAT LAYER
(ZIRCONIA FIBER 10%)

GROUND COAT LAYER
IRON OXIDE LAYER
SUBSTRATE METAL

PROCESS FOR THE PREPARATION OF INORGANIC FIBER CONTAINING ENAMELWARE

This is a continuation of Ser. No. 220,726, filed Dec. 29, 1980, now abandoned.

BACKGROUND OF THE INVENTION

The present invention has as its object to upgrade enamelware and to make drastic improvements in the manufacturing technique thereof, and is characterized by a variety of different advantages over the prior art ware of the enabled type, which result from a procedure comprising the steps of mixing inorganic fibers into a slip prior to firing the enamelware, enameling the ware and heating the ware by drying and firing.

A traditional method for the production of enamelware involves (1) forming the base, (2) pretreating the base, (3) preparing a slip, (4) enameling, (5) drying, (6) firing, (7) quality control of the enamel, and (8) decorating.

SUMMARY OF THE INVENTION

In accordance with the present invention, the inorganic fibers are added at the step of the slip preparation, and the resulting fiber containing slip is applied to either one or both of the base and finishing coats, depending upon the intended use.

DETAILED DESCRIPTION OF THE INVENTION

For example, in the glass lining field where a highly anti-corrosive cover coat is applied, strict pin hole testing should be carried out since the resulting film has a thickness greater than the ordinary iron enamel.

The lining including the ground coat should usually be three or more coats on the ware. Fiber containing glass lining layers may be applied to ground and cover coats. In particular, it is preferable to apply the fiber containing layer to the lower part of the cover coat and an ordinary enamel to the final surface layer. The fiber containing enamel may of course be applied only to the final surface layer.

In accordance with the present invention, the ground and cover coats containing fibers may be prepared from either one frit or several frits in the form of a mixture thereof.

When a fiber containing slip is prepared by the wet process, the mill charge may contain silica, clay, electrolytes, pigments etc., and water depending upon the use of the finished enamelware. The mill charge is mixed with inorganic fibers and then ground. Alternatively, the mill charge may previously be ground wet in a ball mill to a slip having a given particle size, into which inorganic fibers are then mixed.

In still another embodiment, only the frit is previously ground in a ball mill to a powder having a desired particle size. For instance, 50 grams of this frit powder are placed on a 200 mesh sieve and washed sufficiently with water, leaving solid matter thereon in an amount of 2 to 6 grams on a dry basis. This powder is blended with inorganic fibers and applied as such by means of a dry spray gun. In a further embodiment, the frit is blended dry with inorganic fibers and mixed, if required, with silica, clay, electrolytes, water, alcohols, organic solvents etc. to prepare a slip.

The steps of preparing enamel according to the present invention are fundamentally based on the known procedure, but differ therefrom in that the inorganic fibers are added at the step of preparing the slips for the ground and cover coats prior to firing.

Enameling or coating may be performed, either dry or wet with the use of slushing, spraying or dipping.

In the inorganic field of cement, gypsum or the like, it has already been known to add inorganic fibers to an object to convert it into a lightweight composite body having increased mechanical strength; however, it appears that this technique merely involves forming a fiber containing object.

The present invention is of technical significance in that inorganic fibers are added at the step before firing the ground and cover coats forming part of the enamelware, and an enamel corresponding to a matrix is fused at the step of enameling and drying followed by firing (effected at about 700° to 930° C.) in such a manner that the fibers are permitted to exhibit an effect from the firing step. The properties of the enamelware obtained upon firing are not found in the ordinary enamelware at all.

In the present invention, it is possible to include inorganic fibers having a diameter of 30 microns or less and a length of 5 millimeters or less in the enamel. However, the fibers used preferably have a diameter of 20 microns or less, more particularly 5 to 15 microns, and a length of 3 millimeters or less, more particularly 0.1 to 2 millimeters.

The amount of inorganic fibers added is at most 20% based on 100% of enamel frits, but is preferably in the range of 2 to 10%.

The present invention is applicable to metals which can be enameled, such as low-carbon sheet steel, cast-iron, aluminium and stainless steel, and to the ordinary type of enamelware, aluminium, copper and stainless enamels, or glass lining, ceramic coating and self-cleaning enamels.

The inorganic fibers used in the present invention, which are different in composition from enamel glass, include fibers made of glass or commercially available glass, naturally occurring mineral fibers such as rock fibers and "Kaowool", ceramic fibers artificially prepared from zirconia, alumina, chromium oxide or the like, whiskers, metallic fibers and the like.

Except for the case where the inorganic fibers contained in the enamelware are identical with the enamel frits, i.e. in the case of inorganic fibers having a different composition from the frits, such as glass fibers (being higher in melting point and over 700° C. in terms of softening point), mineral fibers having a melting point of over 1000° C., for instance, rock fibers and "Kaowool", ceramic fibers artificially prepared from zirconia, alumina, chromium oxide or the like, whiskers, metallic fibers or the like, remain in the finished enamelware, and serve to enhance the properties of the finished products. For example, the presence of the inorganic fibers results in a reduction of blisters and inhibition of large bubbles, and improves in color shading resistance, resistance to cracking owing to chemicals (prevention of cracks), thermal shock resistance and mechanical shock resistance. Further, the fibers are effective in preventing flowing or residence of coats while the matrix enamel is melted under firing conditions.

It is also possible to control the residual compression stress of the enamel occurring relative to the metal object and the corrosion resistance thereof by the addition of inorganic fibers, taking their coefficient of thermal expansion and corrosion resistance into consideration.

The addition of fibers in place of particles makes drastic improvements in the steps of enameling, drying and firing. Even when a portion of enamel is applied in a thicker layer as compared with the prior art, the enamel neither flows at the enameling step nor cracks at the drying step, and withstands the tensile strength produced by the breaking of the frit particles and the difference in thermal expansion between the metal object and the enamel in the course of firing. In the prior art, the enamel film obtained by single enameling has a thickness on the order of, for example, 0.1 to 0.3 mm. According to the present invention, however, it can have about ten times this thickness, or on the order of 1.0 to 3.0 mm. Thus, the number of enamelings and firings in the preparation of the enamelware can be limited successfully.

Since the randomly oriented fibers serve as passes for the liberation of gases generated in the fusion of the enamel frit particles, the amount of blisters in the fiber containing enamelware is reduced to about ½ to ⅓ of that in the conventional enamelware comprising fired frit particles.

Since the enamelware is a composite body comprising a film of enamel glass applied on metalware, there are some restrictions in view of the coefficient of thermal expansion of the metalware used and the enamel glass applied, as well known in the art. By way of example, reference is made to the case where an enamel glass having a coefficient of thermal expansion of $98 \times 10^{-7}/°C$. is applied to low-carbon steel having a coefficient of thermal expansion of $140 \times 10^{-7}/°C$. When a 6 mm thick steel sheet having an area of 60 $mm^2$ is enameled to a thickness of more than 1 mm, the residual compression stress of the enamel film is reduced to a considerable degree depending upon the thickness and size of the sheet. In particular, a thickness of 2 or 3 mm results in an about 60 or 70 lowering of the residual compression stress. In this connection, of course, when a flange is enameled on its convex portion R, R inevitably imposes considerable restrictions upon enameling.

In this respect, the fiber-filled enamelware maintains a residual compression stress depending upon the thickness of the enamel film and withstands stresses exerted by the metalware even on the R portion, if present. Thus, it is found that the surface of the enameled object is of high quality.

Now consideration is given to the drying step performed upon the wet-application of the fiber-filled enamel. According to the present invention, it is possible to dry the coated object by rapid heating.

Usually, the time during which the ware is allowed to stand and the atmospheric humidity and temperature are considered to be of importance in the drying step after enameling. Although it is required to dry the ware in a gradual fashion for the satisfactory removal of water, the water may separate from the enamel, leaving a water line.

With the drying step as mentioned above, the fiber-filled enamel according to the present invention can be dried by rapid heating in a drying furnace maintained at 120° C. immediately upon the completion of enameling without causing breaks in the enamel or having an adverse influence on the next firing step.

When glass fibers having the same composition as that of the enamel glass equivalent to a matrix are selected and used as the inorganic fibers, the amount of the glass fibers remaining in the enamel can be determined depending upon the strength of firing conditions. However, the glass fibers may possibly be fused under excessive firing conditions.

Primary objects of the use of such glass fibers are to be take full advantage of the fibers at the enameling and firing steps, and to reduce blisters and prevent formation of large bubbles and breaking of the enamel owing to the chemicals at the firing step. However, any changes in the color and gloss of the appearance of the enamel due to the presence of the fibers should carefully be avoided.

The present invention will now be explained in more detail by the following non-restrictive examples with reference to the accompanying drawings in which:

FIG. 1-1 is a micrograph of the surface layer of the enamelware containing rock fibers according to the present invention;

FIG. 1-2 is a micrograph of the surface of a cover enamel which is similar to that of FIG. 1-1 but free from fibers;

FIG. 1-3 is a micrograph of the section of the enamel surface of FIG. 1-1;

FIG. 1-4 is a micrograph of the section of the enamel surface of FIG. 1-2;

FIG. 2-1 is a micrograph of the surface of a enamel containing zirconia fibers;

FIG. 2-3 is a micrograph of the section of FIG. 2-1;

FIGS. 3-1 and 4-1 are micrographs of the surfaces of enamels containing "Kaowool" and glass fibers, respectively;

FIGS. 3-2 and 4-2 are micrographs of the surfaces of enamels which are similar to those of FIGS. 3-1 and 4-1 but free from fibers;

FIG. 6-1 is a reflecting type micrograph of the enamel of Ex. No. 5-1 after anti-corrosion testing with 20% hydrochloric acid;

FIG. 6-2 is a reflecting type micrograph similar to FIG. 6-1, which is taken of the fiber-free enamel of a control run No. C-5-5;

FIG. 7-1 is a (reflecting type) micrograph of the enamel of Ex. No. 5-2 after anti-corrosion testing with a 4% sodium hydroxide solution;

FIG. 7-2 is a micrograph similar to FIG. 7-1, which is taken of the enamel of a control run No. C-5-5;

FIG. 8-1 is a view illustrative of the test sheet steel having a ground coat B applied over the entire surface and a cover coat A applied over the upper half thereof prior to enamel flow testing;

FIG. 8-2 is a view illustrative of the test sheet steel after enamel flow testing; and FIG. 8-3 is a graph showing the relationship between the flowing rate of enamel and the temperature.

EXAMPLE 1

Figure 11:
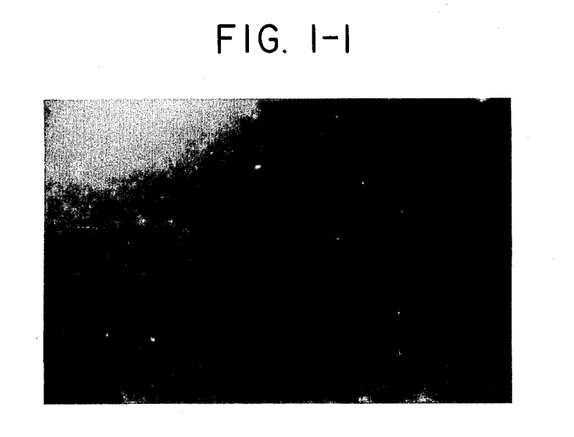
Figure 12:
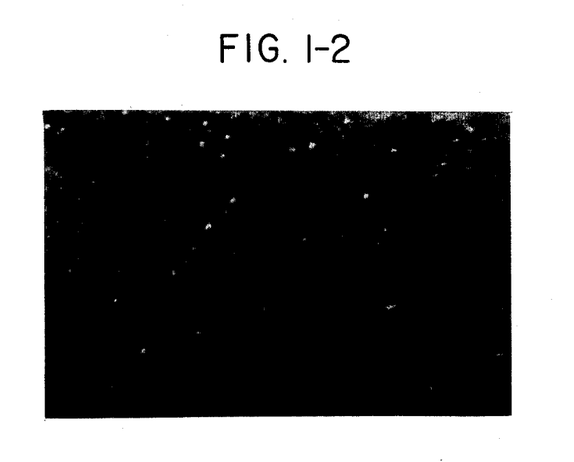

A ground coat B was applied on a 4.5 mm thick low-carbon steel sheet having an area of 60 $mm^2$. On the ground coat B were applied wet a cover coat A (100%) mixed with 5% of rock fibers (mineral fibers) (diameter: 5 to 20 microns, length: 1 to 3 mm; and composition analysis: (in weight %) $SiO_2$ 42%, CaO 37%, $Al_2O_3$ 11% and other alkali ingredients). With a zoom type binocular stereo-microscope MQDEL (manufactured by OLYMPUS Co., Ltd.), micrographs (x 50) were taken of the surface layer of the fired enamel to examine the distribution of blisters therein. These micrographs are FIGS. 1-1 and 1-2, the former showing the fiber containing cover enamel A and the latter a control sample free from fibers.

The mill charge and firing conditions for the cover enamel A are summarized in Table 1.

TABLE 1

| | (Cobalt-colored frits) | |
|---|---|---|
| | Present invention | Control sample |
| Cover enamel A | 100% | 100% |
| Mill    Clay | 2% | 2% |
| charge  CMC | 0.05% | 0.05% |
| Barium chloride | 0.3% | 0.3% |
| Water | suitable amount | suitable amount |
| Rock fibers | 5% | 0% |
| Firing conditions | 820° C. × 15 minutes | |
| Number of coats | 1 | 3 |

Both FIGS. 1-1 and 1-2 show the distribution of blisters over the surface layer. While isolated blisters are virtually not found in the enamel to which 5% of rock fibers have been added according to the present invention (FIG. 1-1), the control sample free from rock fibers (FIG. 1-2) is found to have therein a number of isolated blisters.

Figure 13:
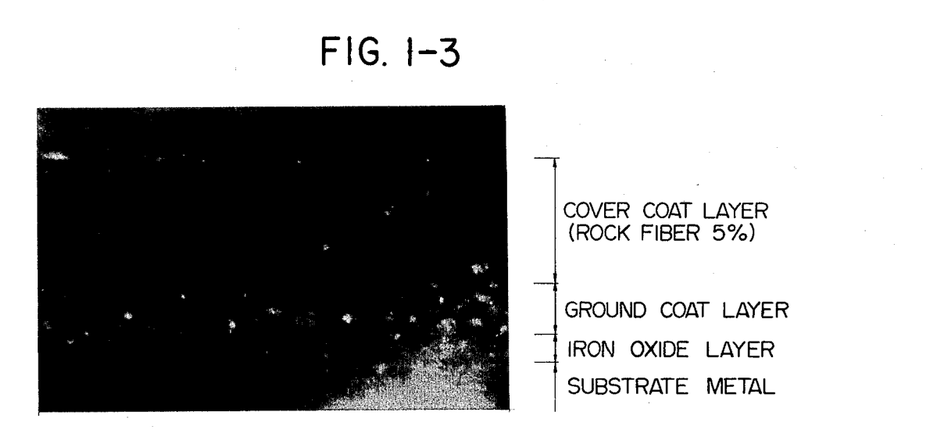
Figure 14:
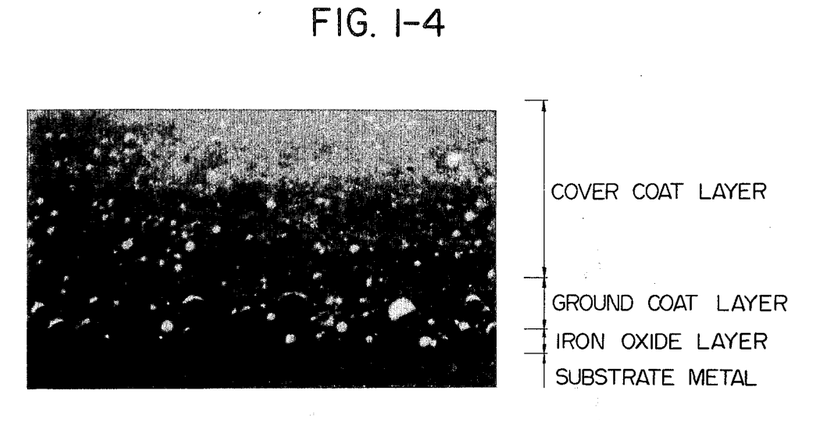

FIGS. 1-3 and 1-4 show the distribution of blisters in the sectional layer of the enamel. The ground coat of the enamel in which the fibers have been added according to the present invention (FIG. 1-3) is found to have therein considerable blisters due to the absence of fibers, while the cover coat has a limited amount of blisters owing to the effect of 5% of rock fibers added and is only 2% in terms of porosity. However, the control sample (FIG. 1-4) has a greater amount of blisters and is 9% in terms of porosity. The photograph of the section of the control sample is bright as a whole due to the presence of fine pores. In FIGS. 1-3 and 1-4, a stands for metalware; b an iron oxide layer; c a ground coat layer; and d a cover coat layer. A comparison of FIG. 1-3 with FIG. 1-4 indicates that the present invention provides an enamel film by single cover-enameling, the thickness of which is equivalent to that of an enamel film obtained by repeating cover-enameling about three times with the use of the control sample.

EXAMPLE 2

Figure 21:
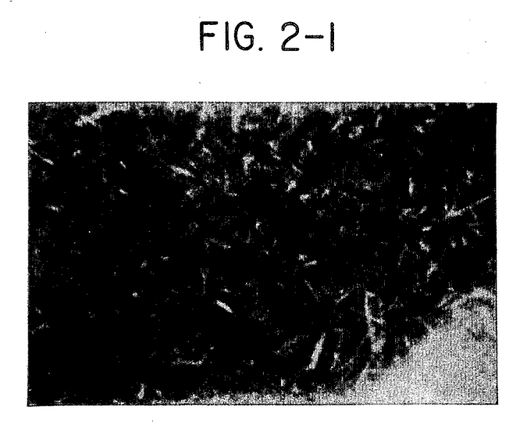
Figure 23:
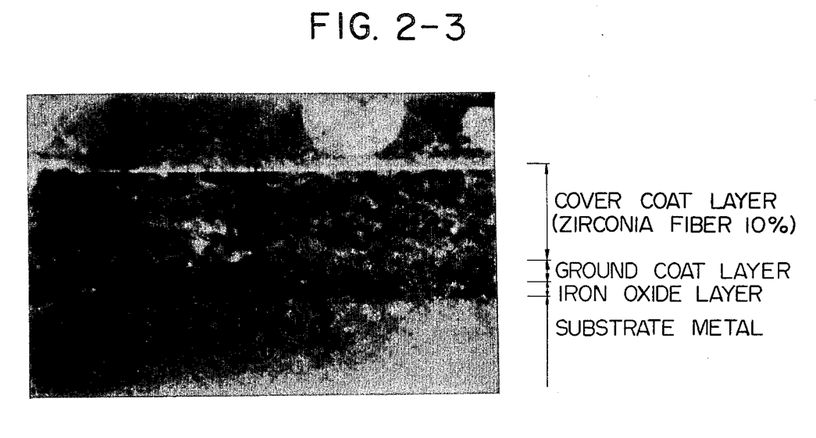

A ground coat B was applied on a 4.5 mm thick low-carbon steel sheet having an area of 60 mm². On the ground enamel B was applied dry a portion of a cover enamel A (100%) mixed with 10 weight % of artificially fabricated zirconia fibers (diameter: 10 to 30 microns, length: 0.1 to 2 mm). Micrographs (x 50) were taken of the distribution of blisters over the surface layer (FIG. 2-1) and the sectional layer (FIG. 2-3) of the fired enamel. From FIG. 2-1, it is found that the ground and cover coats are substantially free from blisters and, hence, only 0.5% in terms of porosity.

EXAMPLE 3

Figure 31:
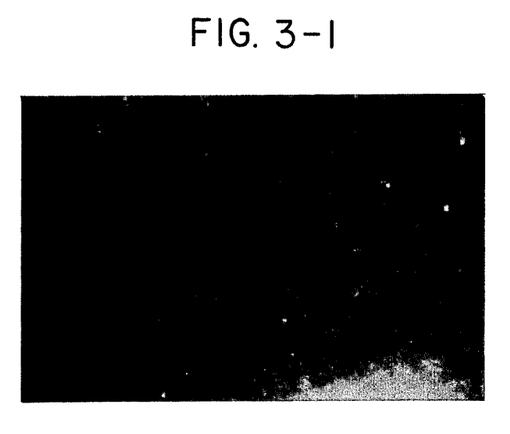
Figure 32:
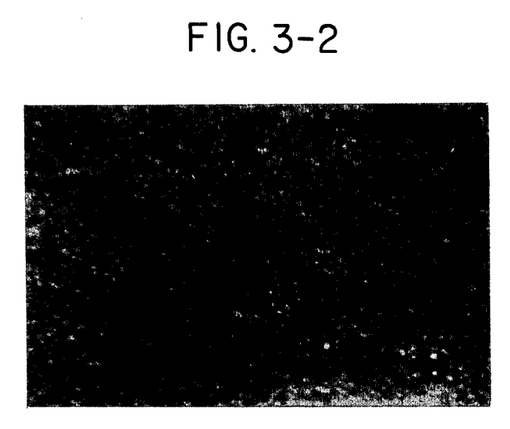
Figure 41:
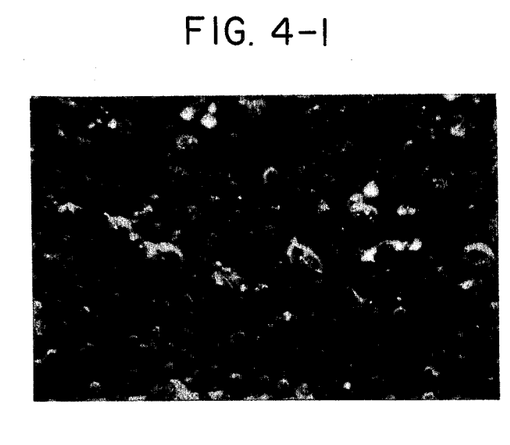
Figure 42:
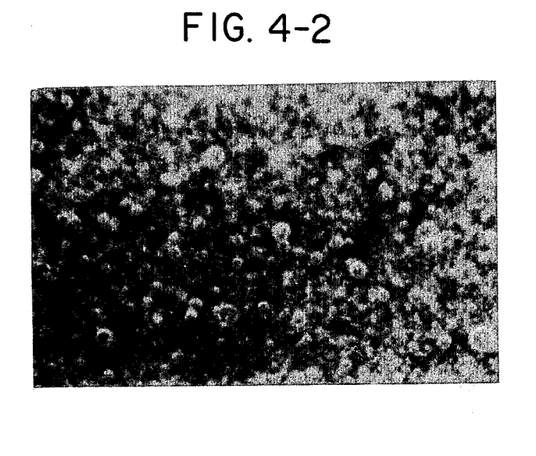

On a 4.5 mm thick low-carbon steel sheet having an area of 60 mm² was coated wet a portion of a ground enamel B (100%) mixed with 2 weight % of mineral fibers "Kaowool" (diameter: 5 to 20 microns, length: 1 to 3 mm; and composition analysis: (in weight %) Al₂O₃ 45%, SiO₂ 51% and TiO₂ 3.5%). Micrographs (x 40) taken of the distribution of blisters over the surface layer of the fired enamel are given as FIGS. 3-1 and 3-2.

The mill charge of the ground coat B is set forth in Table 2. Silica was intentionally not added to the mill charge for the purpose of investigating the influence of "Kaowool".

TABLE 2

| | | Present invention | Control sample |
|---|---|---|---|
| Ground coat B | | 100% | 100% |
| Mill | Silica | 0% | 0% |
| charge | Borax | 0.5% | 0.5% |
| | Clay | 3.5% | 3.5% |
| | Sodium nitrite | 0.3% | 0.3% |
| | Water | suitable amount | suitable amount |
| "Kaowool" | | 2% | 0% |
| Firing conditions | | 800° C. × 15 minutes | |

FIG. 3-1 reveals that the fired coat containing fibers has a limited amount of blisters, and that the fibers exhibit an effect even in an amount of 2%. However, FIG. 3-2 shows that the control sample free from fibers has therein a number of isolated blisters.

EXAMPLE 4

A cover enamel C (uncolored) was mixed with glass fibers (diameter: 16 to 22 microns, length: 1 to 5 mm) in an amount of 5 weight % per 100%, said glass fibers having a composition of $SiO_2+TiO_2+ZnO_2$ 80 mol %, $R_2O$ 15 mol %, RO 3 mol % and $B_2O_3 \times Al_2O_3$ 2 mol %, different from that of said enamel. A microscopic examination was carried out on the behavior of the glass fibers in the enamel in the course of firing effected after enameling.

The cover enamel C was ground to a powder in a dry ball mill in such a manner that, when 50 grams of this frit powder was placed on a 200 mesh sieve and rinsed sufficiently, 4 to 5 grams of solid matter on a dry basis were left on the sieve. The cover enamel was coated dry on the ground coat B on a 4.5 mm thick low-carbon steel sheet having an area of 60 mm², followed by firing.

In firing, a test piece was placed in an electric furnace at 600° C., and heated to 760° C. after the lapse of 15 minutes. The test piece, which was still in an insufficiently fired state, was removed from the furnace to examine the "during-firing" distribution and behavior of bubbles in the glass fiber-containing and fiber-free enamels.

Micrographs of the "during-firing" surface layers of the glass fiber-containing (the present invention) and fiber-free (control) enamels are given as FIGS. 4-1 and 4-2, respectively. According to FIG. 4-1 (the present invention), the coalescence and migration of blisters can be observed under a microscope. The disappearance of blisters occurs three-dimensionally, resulting in a marked lowering of porosity. In the control run of FIG. 4-2, coalescence and migration of blisters are not observed since there are present only isolated blisters. Such blisters still remain upon firing, as already shown by FIGS. 2-1 and 3-2.

EXAMPLE 5

This intends to illustrate that changes in the kind of inorganic fibers to be included in the ware according to the present invention lead to variations in the thermal shock resistance of the enamelware, the corrosion resistance of the cover enamel C applied and the mechanical shock resistance of the cover enamel A. The mill charge and the composition of fibers under examination are set forth in Tables 3 and 4.

TABLE 3

| (MILL CHARGE) | | | | | |
|---|---|---|---|---|---|
| | Ex. No. | | | | |
| | 5-1 | 5-2 | 5-3 | 5-4 | C-5-5 (Control) |
| Cover enamel | 100% | 100 | 100 | 100 | 100 |
| Clay | 2% | 2 | 2 | 2 | 2 |
| Barium chloride | 0.3% | 0.3 | 0.3 | 0.3 | 0.3 |
| Water | suitable amount | suitable amount | suitable amount | suitable amount | suitable amount |
| Kind of inorganic fibers | (1) | (2) | (3) | (4) | none |
| Amount of fibers added | 5% | 5 | 5 | 5 | 0 |

TABLE 4

| Composition of inorganic fibers in mol % | | | | |
|---|---|---|---|---|
| | (1) | (2) | (3)* | (4) |
| $SiO_2 + TiO_2 + ZrO_2$ | 80% | 65% | 42% | 73% |
| $R_2O$ ($Na_2O$, $Li_2O$, $K_2O$) | 15% | 16% | 10% | 17% |
| R.O (CaO, BaO) | 3% | 10% | 37% | 6% |
| $B_2O_3 + Al_2O_3$ | 2% | 9% | 11% | 4% |
| Coefficient of thermal expansion** | 81 | 103 | 90 | 98 |
| Softening point (°C.) | 720 | 540 | 1100 | 480 |

Note:
The composition of (3) is given in weight %.
(4) is glass fibers having the same composition as that of the cover enamel.
**indicates the values of × $10^{-7}$ °C.$^{-1}$ (100° C.–400° C.)

Table 5 shows the firing conditions and the relative amounts of fibers present after firing.

TABLE 5

| Firing conditions and the degree of presence of fibers after firing | | | | | |
|---|---|---|---|---|---|
| | Ex. No. | | | | |
| | 5-1 | 5-2 | 5-3 | 5-4 | C-5-5 (Control) |
| Firing conditions | 820° C. × 15 min. | 820° C. × 15 min. | 820° C. × 15 min. | 820° C. × 15 min. | 820° C. × 15 min. |
| Presence of fibers after firing | present | slightly present | present | indistinguishable | — |
| Number of coats | 1 | 1 | 1 | 1 | 3 |

Note:
The total thickness of enamel: 1.0–1.1 mm
Test piece: low-carbon sheet steel having a thickness of 4.5 mm and an area of 60 mm.
No. C-5-5 is a control run.

In the thermal shock resistance test, a test piece was heated to a temperature of 150° C. for 30 minutes, removed from the heat source, and was quenched by spraying water at 20° C. on the surfaces thereof. Examination was carried out on the thus quenched piece for the occurrence of cracks or breaks caused by thermal shock. When no breaks were found, the test piece was next heated to a temperature 10° C. higher than the first-mentioned test temperature for 30 minutes. This cycle was repeated until the occurrence of breaks. The difference between the water temperature and a temperature 10° C. lower than the temperature at which cracks or breaks occur is defined as the initial heat resistance temperature difference. In addition, the temperature at which breaks progress to peeling of the enamel from the ware was measured. The results are summarized in Table 6.

TABLE 6

| Results of thermal shock resistance test of fiber-containing enamel | | | | | |
|---|---|---|---|---|---|
| | Ex. No. | | | | |
| | 5-1 | 5-2 | 5-3 | 5-4 | C-5-5 |
| Initial heat resistance temperature difference (°C.) | 200 | 170 | 190 | 170 | 170 |
| Peeling temperature of enamel (°C.) | higher than 250 | 220 | higher than 350 | 210 | 200 |

Figure 5:
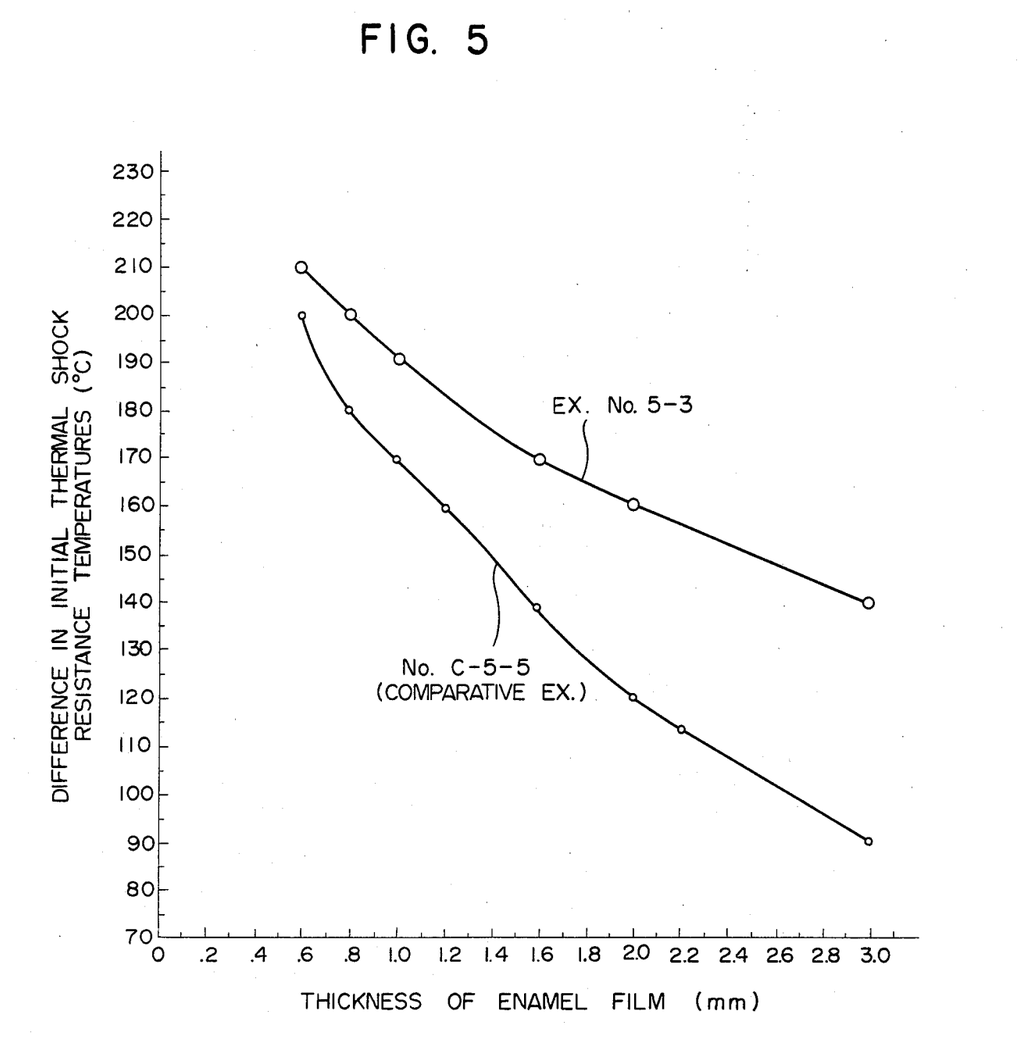
FIG. 5 is a graph showing the relationship between the thickness of the enamel film and the difference in thermal shock resistance temperature in fiber containing and fiber-free enamels.

FIG. 5 illustrates a comparison of the fiber-containing enamel according to the present invention (Ex. No. 5-2) with the fiber-free enamel (Ex. No. C-5-5) in terms of the relationship between the thickness of the enamel films and the initial thermal shock resistance temperature difference.

The test piece used was sheet steel having a thickness of 4.5 mm and an area of 60 mm². The thickness of the fiber-containing enamel increases with decreases in the thermal shock resistance. However, the fiber-free enamel of the control run suffers a considerable lowering of the thermal shock resistance, as shown in FIG. 5.

EXAMPLE 6

Because of its severity, the corrosion resistance test of the fiber-filled enamel was performed, for easy estimation, according to the corrosion test method employed in the glass lining for chemical products.

Acid resistance was measured according to the standard of JIS R-4301 as follows: 80 mm φ disks were coated with the cover enamels of Ex. Nos. 5-1, 5-5-3, 5-4 and C-5-5 (control run) to prepare test pieces. After being washed with methanol, these pieces were dried in a dryer maintained at 100° C. for one hour, and cooled down to room temperature in a desiccator. Then, the weight of each piece was precisely measured to the order of 0.1 mg. The test pieces were placed at the top and bottom of a pyrex glass-made cylinder with an anti-corrosive packing (of, e.g., neoprene rubber) in between said cylinder having an internal diameter of 50 mm and a height of 110 mm and a branch pipe mounted on its portion 25 mm apart from the top end for connecting a reflux condenser which cools steam generated. The test pieces were then clamped to the packing by means of stainless jigs. 100 cc of a 10% hydrochloric acid solution was introduced through the opening of the branch pipe into the cylinder, which was in turn fitted with the reflux condenser. The thus constructed test assembly was allowed to stand on an electric furnace and heated for two days while boiling the solution to investigate the corrosion resistance of the test pieces to the solution (liquid phase) and the vapor (vapor phase). Upon the completion of testing, the test pieces were washed with tap water and methanol, and dried in a dryer maintained at 100° C. for one hour, after which they were cooled down to room temperature in a desiccator. The weight of the pieces was precisely measured to the order of 0.1 mg to determine a difference from the original weight. For the determination of the weight loss of the test piece due to corrosive dissolution, the difference was divided by the area of the piece and the test period. The results are indicated in Table 7.

TABLE 7

| | Acid resistance | | | | |
| --- | --- | --- | --- | --- | --- |
| | Ex. No. | | | | |
| | 5-1 | 5-2 | 5-3 | 5-4 | C-5-5* |
| Weight loss due to corrosive dissolution g/m²/day | | | | | |
| Liquid phase | 0.5 | | 0.8 | 0.7 | 1.0 |
| Vapor phase | 0.9 | | 1.7 | 1.5 | 2.0 |

Note:
*Control run

Figure 61:
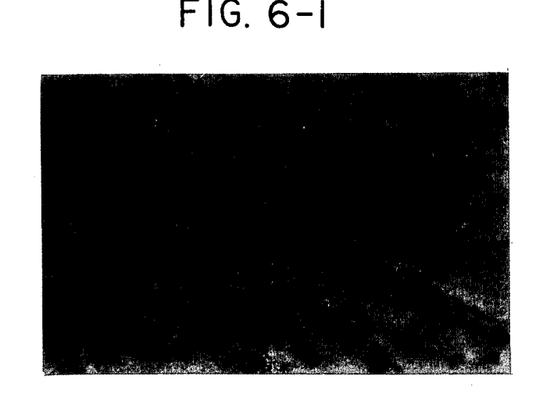
Figure 62:
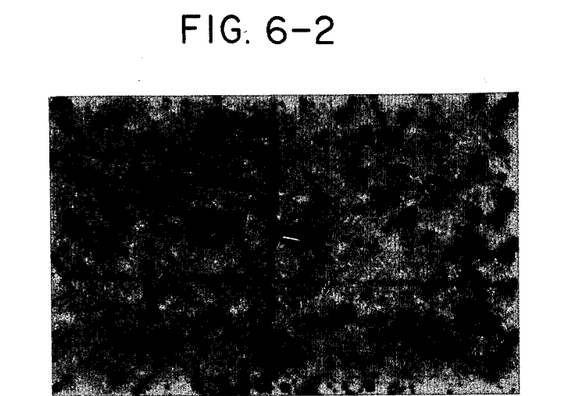

FIG. 6-1 is a reflecting type micrograph (x 125) taken of the fiber-containing enamel (Ex. No. 5-1) after the acid corrosion resistance test had been completed, and FIG. 6-2 is a similar photograph (x 125) taken of the fiber-free enamel (control run No. C-5-5) after the same test had been completed. The glass fiber-containing enamel (FIG. 6-1) is found to suffer a smaller degree of corrosion as compared with the control run. Corrosion appears in the form of black specks in the photograph.

Alkali resistance (only to liquid phase) was measured according to the standard of DIN-51156, West Germany, as follows: Test pieces were immersed in a 4% sodium hydroxide solution at 80° C. for 2 days. The weight loss of the pieces due to corrosive dissolution was determined in the same manner as in the acid corrosion test. The results are set forth in Table 8.

TABLE 8

| | Alkali resistance | | | | |
| --- | --- | --- | --- | --- | --- |
| | Ex. No. | | | | |
| | 5-1 | 5-2 | 5-3 | 5-4 | C-5-5* |
| Weight loss due to corrosive dissolution (liquid phase) g/m²/day | 0.8 | 0.6 | 2.5 | 2.0 | 2.5 |

Note:
*Control run

The enamel of Ex. No. 5-2 having therein fibers excelling especially in acid resistance and the fiber-free enamel of control run No. C-5-5 were tested on their durability in a 4% sodium hydroxide solution at 80° C. for a long period of 45 days. It is found that the weight loss of the former due to corrosion is lower than that of the latter by a factor of 4 or more.

Figure 71:
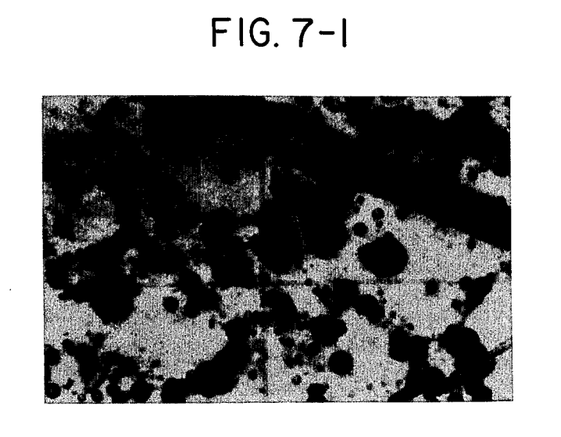
Figure 72:
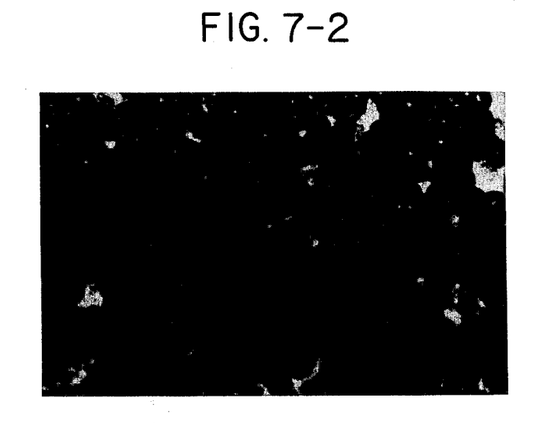

The reflecting type micrograph of FIG. 7-1 shows the corrosion of the fiber-filled enamel No. 5-2 subjected to the aforesaid durability test under the aforesaid conditions. FIG. 7-2 is a similar photograph of the control enamel No. C-5-5 subjected to the same test.

These figures indicate that the enamels according to the present invention and the control run are quite different in alkali resistance from each other. The alkali/acid resistance of the fiber-containing enamel, which depends upon the composition of the fibers used, is by far superior to that of the fiber-free enamel.

EXAMPLE 7

In this example, the mechanical shock resistance of the fiber-containing enamel was examined. The ground enamel B was applied on a low-carbon steel sheet having a thickness of 4.5 mm and an area of 100 mm². On the ground coat was applied the cover enamel of Ex. No. 5-1, 5-2, 5-3, 5-4 to a total thickness of 1.0 to 1.1 mm, thereby preparing a test piece.

In the mechanical shock resistance testing, a 200 g and 35 mm φ steel ball was vertically dropped by gravity-drop from a height of 0.5, 1.0 and 2.0 m on the enamel piece horizontally placed on the floor. The results are indicated in Table 9.

TABLE 9

| | Ex. No. | | | | |
| --- | --- | --- | --- | --- | --- |
| | 5-1 | 5-2 | 5-3 | 5-4 | C-5-5 |
| 0.5 m | no peeling | no peeling | no peeling | no peeling | no peeling |
| 1.0 m | no peeling | no peeling | no peeling | 5-10% peeling | 10-20% peeling |
| 2.0 m | no peeling | 10-20% peeling | no peeling | 20-30% peeling | 50-60% peeling |

The mechanical shock resistance of enamelware is influenced by the amount of fibers remaining therein.

EXAMPLE 8

Figure 83:
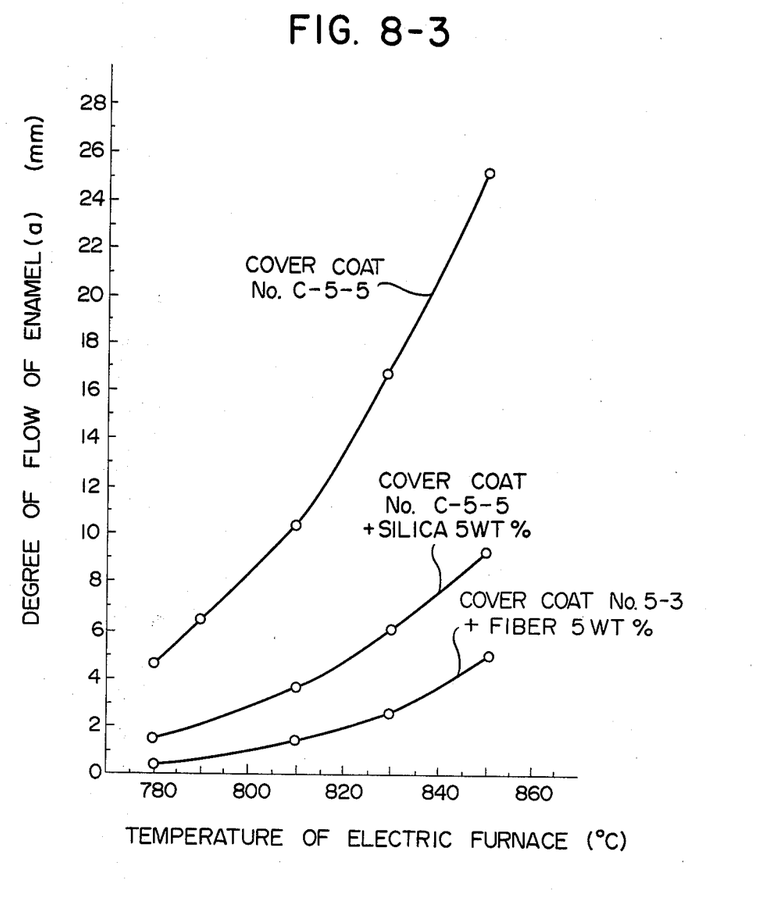

FIG. 8-3 illustrates a comparison of the "during-firing" fiber-containing enamel and fiber-free enamel in terms of the results of the accelerated flow testing of enamel.

As well known in the art, flowing or residence of enamels during firing is caused by various factors including the thickness of the ground coat applied and the heating/firing method employed. In this example, however, a close examination was carried out on the presence of the fibers in the cover coat and the flow of enamel during firing, with the ground coat and the heating/firing method kept constant.

Figure 81:
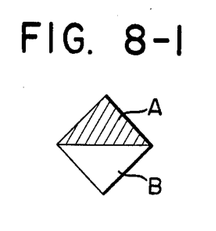

As shown in FIG. 8-1B, a ground coat B was applied over the entire surface of a test piece to a thickness of 0.2 mm, said piece being a steel sheet with the thickness being 4.5 mm and the area 60 mm². Cover coats A were No. 5-3, No. C-5-5, and No. C-5-5 mixed with 5 weight % of 325 or less mesh slica powders. After heating the piece with the ground coat at 870° C. for 15 minutes, the cover coat was horizontally applied on one half of the piece to a total thickness of 1.5 to 1.6 mm, and heated at 820° C. for 15 minutes.

Figure 82:
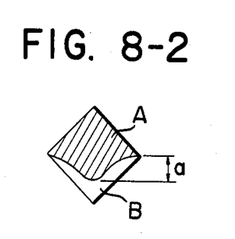

In the accelerated flow testing of enamel, the square piece was placed vertically on the electric furnace having a temperature of 770° C. to 840° C. to examine the flow of enamel after heating (FIG. 8-2). From the results given in FIG. 8-3, it is found that the degree of flowing of enamel increases in the order of No. C-5-5; No. C-5-5+5 weight % of silica powder; and No. 5-3 (containing 5 weight % of fibers).

The difference between No. 5-3 and No. C-5-5 results primarily from the particle size and the fibers present.

The composition of the ground coat B and the cover coats A and C is indicated in Table 10.

TABLE 10

| Composition (mol %) | Ground B | Cover A | Cover C |
|---|---|---|---|
| $SiO_2 + TiO_2 + ZrO_2$ | 55 | 73 | 75 |
| $R_2O$ ($Na_2O + K_2O + Li_2O$) | 21 | 17 | 16 |
| RO (CaO + BaO) | 6 | 5 | 6 |
| $B_2O_3 + Al_2O_3$ | 15.5 | 4 | 3 |
| $CoO + Nio + MnO_2$ | 2.5 | 1.0 | — |

As mentioned above, the process for the preparation of fiber-containing enamelware according to the present invention improves the quality of the enamelware, in order words, serves to reduce blisters and prevent formation of macro-bubbles and enhances the color shading resistance, the resistance to cracking owing to chemicals (prevention of breaks), the thermal shock resistance, the mechanical shock resistance and the like properties. In addition, the present process is by far superior to the prior art in relation to enameling/drying/firing. Thus, the present invention is of great commercial value in this field.

What is claimed is:

1. In a process for preparing enamelware which comprises preparing a slip, enameling a ware with the slip, drying the enameled ware and firing the dried ware, the improvement wherein inorganic fibers having a diameter of 5 to 30 microns and a length of 1 to 5 millimeters are added to the slip prior to enameling, and an enamel film having a thickness of 1–3 mm is produced by a single enameling step.

2. A process according to claim 1, wherein the inorganic fibers have a diameter of 5 to 15 microns and a length of 1 to 3 millimeters.

* * * * *